US009269190B1

(12) United States Patent
Chau et al.

(10) Patent No.: US 9,269,190 B1
(45) Date of Patent: Feb. 23, 2016

(54) SYSTEM AND METHOD FOR DISPLAYING TRANSITIONS BETWEEN MAP VIEWS

(71) Applicant: Google Inc., Mountain View, CA (US)

(72) Inventors: Stephen Chau, Stanford, CA (US); Andrew Timothy Szybalski, San Francisco, CA (US); Stephane Lafon, Sunnyvale, CA (US); Andrew Lookingbill, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/482,555

(22) Filed: Sep. 10, 2014

Related U.S. Application Data (63) Continuation of application No. 12/618,157, filed on Nov. 13, 2009, now Pat. No. 8,868,338.

(60) Provisional application No. 61/199,229, filed on Nov. 13, 2008.

(51) Int. Cl.
| | |
|---|---|
| *G06T 19/00* | (2011.01) |
| *H04W 4/02* | (2009.01) |
| *G06T 11/20* | (2006.01) |
| *G06F 3/0481* | (2013.01) |

(52) U.S. Cl.
CPC .......... *G06T 19/003* (2013.01); *G06F 3/04815* (2013.01); *G06T 11/206* (2013.01); *H04W 4/02* (2013.01); *G06T 2210/36* (2013.01); *G06T 2215/12* (2013.01)

(58) Field of Classification Search
CPC .............. G06T 11/206; G06T 2210/36; G06T 2210/44; G06T 2215/12; H04W 4/02; G06F 3/04815

USPC .................. 701/212; 345/646, 648, 649, 653
See application file for complete search history.

(56) References Cited

U.S. PATENT DOCUMENTS

| | | | |
|---|---|---|---|
| 5,460,239 | A | 10/1995 | Jensen |
| 5,490,239 | A | 2/1996 | Myers |
| 5,742,924 | A | 4/1998 | Nakayama |
| 6,452,544 | B1 | 9/2002 | Hakala et al. |
| 6,504,535 | B1 | 1/2003 | Edmark |
| 6,628,283 | B1 | 9/2003 | Gardner |

(Continued)

FOREIGN PATENT DOCUMENTS

| | | |
|---|---|---|
| CN | 1875613 A | 12/2006 |
| JP | 08500925 | 1/1996 |

(Continued)

OTHER PUBLICATIONS

Canadian Office Action for Application No. 2753419 dated Jan. 24, 2014.

(Continued)

*Primary Examiner* — Fadey Jabr
*Assistant Examiner* — Aaron L Troost
(74) *Attorney, Agent, or Firm* — Lerner, David, Littenberg, Krumholz & Mentlik, LLP (57) ABSTRACT

A system and method is provided for displaying a transition between a map and a street level image. In one aspect, the display on a mobile device transitions from a top-down view of a map to a street-level view of an image, such as a panoramic image, such that the mobile device uses the currently stored map image to perform a tilt and zoom transition.

20 Claims, 9 Drawing Sheets

(56) References Cited

U.S. PATENT DOCUMENTS

| | | | |
|---|---|---|---|
| 6,700,578 | B2 | 3/2004 | Kamata et al. |
| 6,990,681 | B2 | 1/2006 | Wang et al. |
| 7,199,793 | B2 | 4/2007 | Oh et al. |
| 7,221,364 | B2 | 5/2007 | Matsumoto et al. |
| 7,420,558 | B2 | 9/2008 | Urano et al. |
| 7,613,566 | B1 * | 11/2009 | Bolton ............... G01C 21/3635 340/990 |
| 2003/0038892 | A1 | 2/2003 | Wang et al. |
| 2003/0142115 | A1 | 7/2003 | Endo et al. |
| 2005/0081161 | A1 | 4/2005 | MacInnes et al. |
| 2006/0075442 | A1 * | 4/2006 | Meadow ........... G06F 17/30241 725/91 |
| 2007/0124683 | A1 | 5/2007 | Ranin et al. |
| 2007/0198181 | A1 | 8/2007 | Shimamura |
| 2008/0186330 | A1 | 8/2008 | Pendleton et al. |
| 2008/0189031 | A1 | 8/2008 | Meadow et al. |
| 2009/0046093 | A1 | 2/2009 | Kikuchi et al. |
| 2009/0198767 | A1 | 8/2009 | Jakobson et al. |
| 2009/0237510 | A1 * | 9/2009 | Chen ...................... G06K 9/209 348/159 |

FOREIGN PATENT DOCUMENTS

| | | |
|---|---|---|
| JP | 2000121360 A | 4/2000 |
| JP | 2001005994 A | 1/2001 |
| JP | 2006113857 A | 4/2006 |
| JP | 2008129093 A | 6/2008 |
| WO | 2008147561 A2 | 12/2008 |

OTHER PUBLICATIONS

Canadian Office Action for Canadian Patent Application No. 2753419 dated Jun. 18, 2013.

Chinese Office Action dated Oct. 24, 2012 for PCT Application 201280017715.

Chinese Office Action for Application No. 201080017715 dated Aug. 22, 2013.

Dictionary.com, http://dictionary.references.com/browse/stretch?s=t&path=/, published Mar. 27, 2013.

Hideaki Maeda et.al, "Simple Fabrication of virtual room space using photographed images for Real-time CG" Journal C of Institute of Electrical Engineers Institute of Electrical Engineers of Japan Jul. 1, 2000 vol. 120-C, No. 7 p. 977-985.

Japanese Office Acion for Application No. 2011551307 dated Jan. 7, 2014.

PCT Notification of Transmittal of the International Saerch Report and the Written Opinion of the International Searching Autority for Application No. PCT/US10/25161 dated Apr. 13, 2010, 12 pages.

Chinese Office Action for Application No. CN 201080017715.8 dated Feb. 28, 2015.

* cited by examiner

SYSTEM AND METHOD FOR DISPLAYING TRANSITIONS BETWEEN MAP VIEWS

CROSS-REFERENCE TO RELATED APPLICATIONS

The present application is a continuation of U.S. patent application Ser. No. 12/618,157, filed on Nov. 13, 2009, which claims the benefit of the filing date of U.S. Provisional Patent Application No. 61/199,229 filed Nov. 13, 2008, the disclosures of which are hereby incorporated herein by reference.

BACKGROUND OF THE INVENTION

It is well known to provide mapping programs on mobile devices such as cell phones. In that regard, Google Maps for Mobile is a program that allows users to request map images, both street and satellite, by providing an address, the name of building, latitude and longitude, or some other information that identifies a particular geographical location (hereafter, "geolocation").

Recently, other products such as Google Earth and Google Maps (browser edition) have provided a user with the ability to download street level images as well. These images are typically panoramic photos and are associated with geolocations as well. By downloading and viewing a street level image, the user is able to view a picture of a location taken from the perspective of a car or pedestrian.

A variety of transitions between a map image and a street level image are known. For example, a user may drag an icon of a person in Google Maps (browser edition) onto a street to display and pop up a street level image of the street. In Google Earth, when a user zooms into the satellite map, the map tilts to a viewpoint that is roughly parallel with the ground, shows a horizon and indicates the availability of panoramic images by first showing a camera icon and then showing a ball onto which a portion of the panoramic image is mapped. When the user rotates the satellite image at this zoom level, the balls reorient the panoramic street-level view mapped to the ball to match the new orientation of the satellite image (e.g., rotating from a North to East direction will similarly change the image shown on the ball from looking Northward to looking Eastward).

Not all mobile devices are capable of implementing such transitions. By way of example only, they may lack the ability to drag an icon such as that shown in Google Maps (browser edition). They may also lack the processing power to display the street view transitions of Google Earth. Similarly, if the mobile devices are connected to the Internet over a cellular network, they may lack Google Earth's ability to speedily download and render additional satellite images needed to display distant locations as the user tilts the view and brings more land (or water) into view.

Accordingly, it would be advantageous to provide additional transitions for devices that do not have high-end processors or high-speed connections to map information.

BRIEF SUMMARY OF THE INVENTION

One aspect of the invention provides a method of displaying map information comprising: (a) receiving a map at a mobile device from a server, (b) displaying, on the mobile device, the map from a substantially top-down point of view, (c) receiving a request for a street level image, (d) in response to receiving the request for a street level image, receiving a street level image, (e) prior to displaying the street level image, using a processor to modify the displayed map view to display a transition including an iterative tilting of the displayed map view from the top-down point of view to a street level point of view, and (f) after displaying the stretched map, displaying the street level view.

In the foregoing aspect, the modifying the displayed map view may include displaying a horizon and using a processor to stretch the displayed map to a horizon line so as to make the map appear to be tilted. The stretching may also include zooming into the map. For example, the processor may simultaneously tilt and zoom the map image. The stretching may also include iteratively stretching so as to convey the appearance of flying towards and parallel to the ground. In that regard, the transition from top-down view to street level view may be animated.

Yet further, the position of the horizon line may be selected so as to coincide with the horizon of the street level image. The processor may also add objects to the display, such as a sun above the horizon.

Optionally, the request for a street level image may be generated as a result of the user requesting a particular zoom level, such as zoom level above the highest zoom level currently available for the top-down map.

Alternatively, instead of stretching the displayed map to a horizon line, the processor may also stretch and display portions of the map that were received prior to the request for a street level image but not displayed at the time of the request.

The street level view may be oriented to correspond with the orientation of the map. Moreover, the street level image and the map may be displayed blended together, before the street level image is shown without the map.

A system in accordance with another aspect of the invention may provide a server storing maps and street level images, both being associated with geolocations, a mobile device having a display, a memory, a user input, instructions and a processor capable of processing the instructions, and a network over which the server and mobile device may exchange information. The instructions of the mobile processor may include routines to: request a map from the server; display the map on the display; request a street level image from the server in response to a user's activation of the user input; prior to displaying the street level image, display a horizon line and use the processor to stretch the map to a horizon line so as to make the map appear to be tilted; and, after displaying the stretched map, displaying the street level view.

DETAILED DESCRIPTION

In one aspect, the system and method provides a transition between a top-down view of a map and a street-level view of an image, such as a panoramic image, on a mobile device such that the mobile device uses the currently stored map image to perform a tilt and zoom transition.

Figure 1:
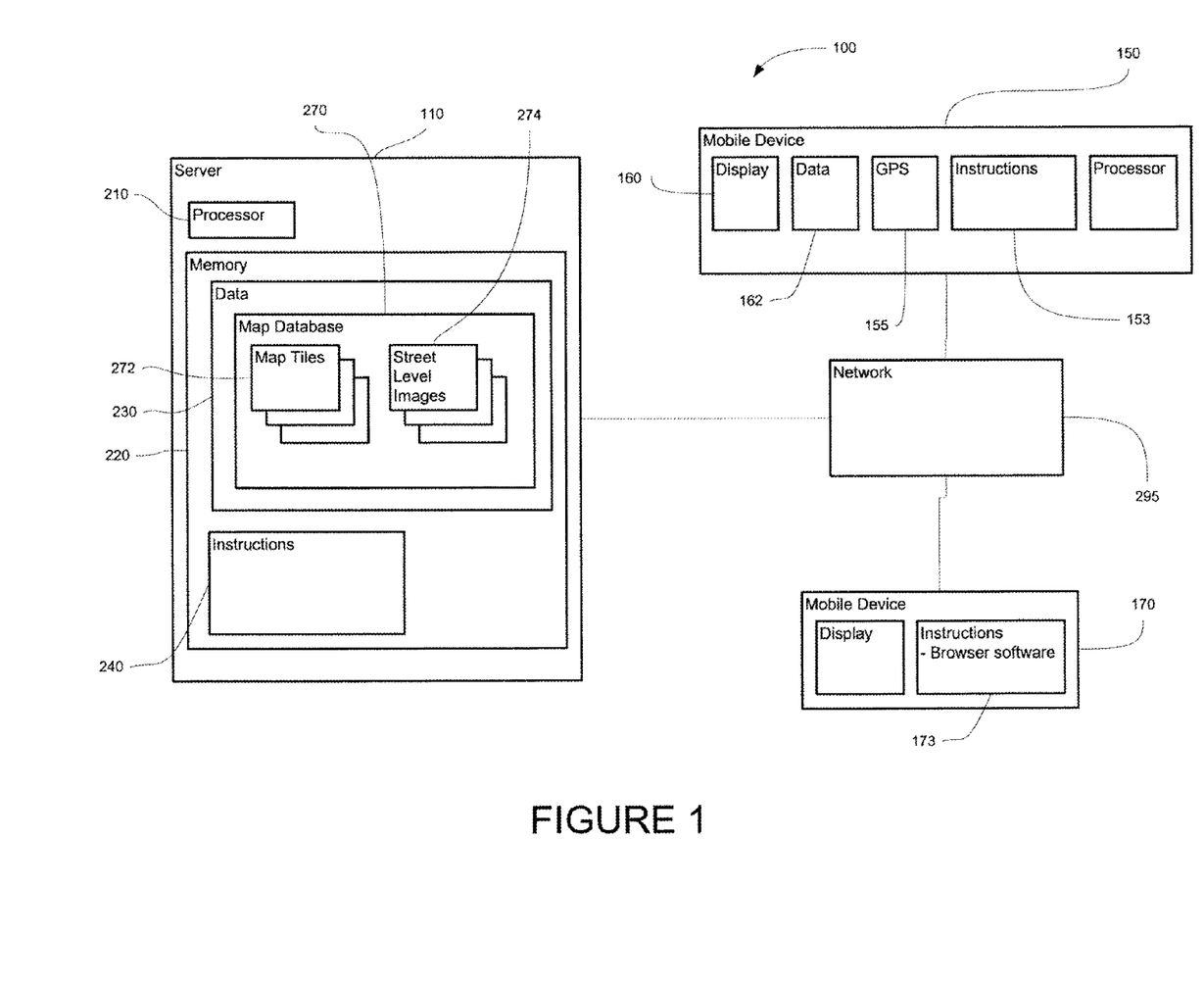
FIG. 1 is a functional diagram of a server and mobile device in accordance with an aspect of the invention.
Figure 2:
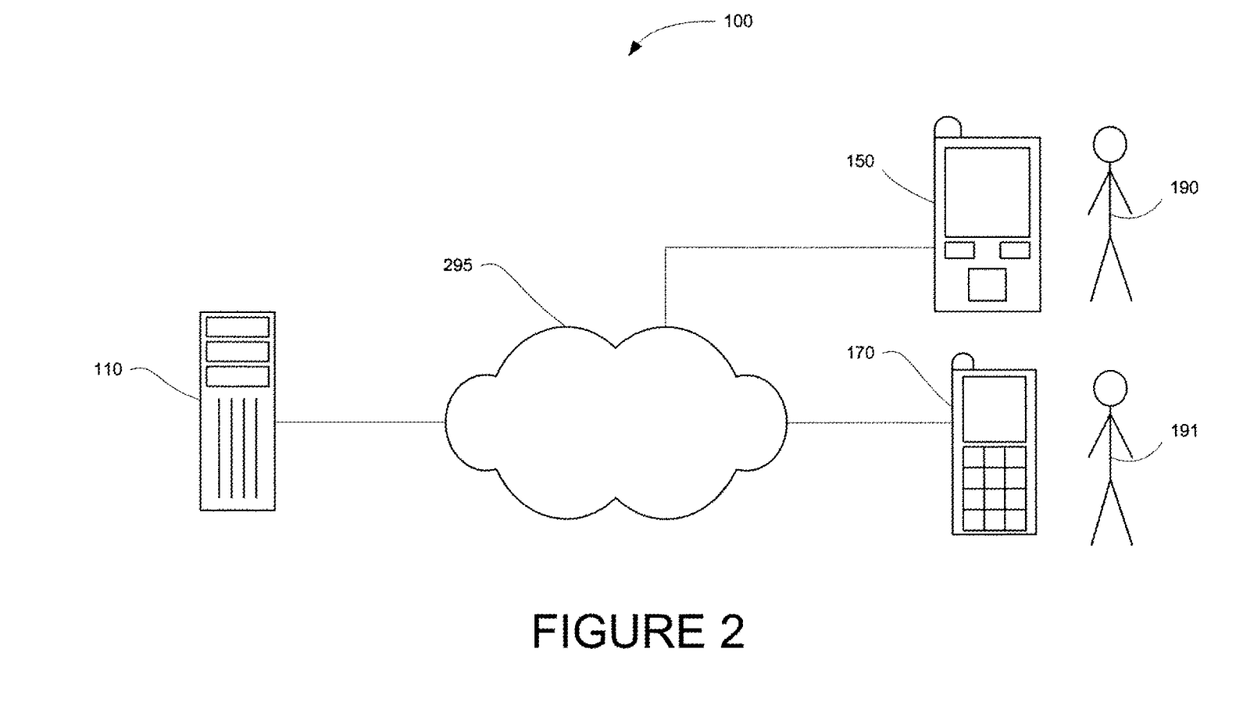
FIG. 2 is a pictorial diagram of a system in accordance with an aspect of the invention.

As shown in FIGS. 1-2, a system 100 in accordance with one aspect of the invention includes a computer 110 containing a processor 210, memory 220 and other components typically present in general purpose computers.

Memory 220 stores information accessible by processor 210, including instructions 240 that may be executed by the processor 210. It also includes data 230 that may be retrieved, manipulated or stored by the processor. The memory may be of any type capable of storing information accessible by the processor, such as a hard-drive, memory card, ROM, RAM, DVD, CD-ROM, write-capable, and read-only memories.

The processor may be any well-known processor, such as processors from Intel Corporation. Alternatively, the processor may be a dedicated controller such as an ASIC.

The instructions 240 may be any set of instructions to be executed directly (such as machine code) or indirectly (such as scripts) by the processor. In that regard, the terms "instructions," "steps" and "programs" may be used interchangeably herein. The instructions also function as an algorithm allowing the processor to perform the purposes intended by the instructions. The instructions may be stored in object code form for direct processing by the processor, or in any other computer language including scripts or collections of independent source code modules that are interpreted on demand or compiled in advance. Functions, methods and routines of the instructions are explained in more detail below.

Data 230 may be retrieved, stored or modified by processor 210 in accordance with the instructions 240. For instance, although the invention is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information which is used by a function to calculate the relevant data.

Although the processor and memory are functionally illustrated in FIG. 1 within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 110 is a server communicating with one or more client computers 150, 170. Each client computer may be configured similarly to the server 110, with a processor, memory and instructions. Each client computer 150, 171 may be a personal computer, intended for use by a person 190-191, having all the internal components normally found in a personal computer such as a central processing unit (CPU), display 160, CD-ROM, hard-drive, user input (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers and network computers lacking local storage capability.

Although the client computers 150 and 170 may comprise a full-sized personal computer, many aspects of the system and method are particularly advantageous when used in connection with mobile devices capable of wirelessly exchanging data with a server over a network such as the Internet. For example, client computer/mobile device 150 may be a wireless-enabled PDA such as a Blackberry phone, and client computer/mobile device 170 may be an Internet-capable cellular phone. In either regard, the user may input information using a small keyboard (in the case of a Blackberry phone), a keypad (in the case of a typical cell phone), a touch screen (in the case of a PDA) or any other means of user input. For ease of illustration, it will be hereafter assumed that client computers 150 and 170 are mobile devices.

Mobile devices 150 and 170 may include a component, such as circuits, to determine the geographic location of the device. For example, mobile device 150 may include a GPS receiver 155. By way of further example, the component may include software for determining the position of the device based on other signals received at the mobile device 150, such as signals received at a cell phone's antenna from one or more cell phone towers if the mobile device is a cell phone.

The server 110 and client computers 150, 171 are capable of direct and indirect communication, such as over a network 295. Although only a few computers are depicted in FIGS. 1-2, it should be appreciated that a typical system can include a large number of connected computers, with each different computer being at a different node of the network 295. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP. Such communication may be facilitated by any device capable of transmitting data to and from other computers, such as modems (e.g., dial-up or cable), networks and wireless interfaces. Server 110 may be a web server.

Although certain advantages are obtained when information is transmitted or received as noted above, other aspects of the invention are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the invention may be implemented by a single computer having a single processor.

Map database 270 of server 110 stores map-related information, at least a portion of which may be transmitted to a client device. For example, map database 270 may store map tiles 272, where each tile is a map image of a particular geographic area. Depending on the resolution (e.g., whether the map is zoomed in or out), a single tile may cover an entire region, such as a state, in relatively little detail or just a few streets in high detail. The map information of the system and method are not limited to any particular format. For example, the images may comprise street maps, satellite images, or a combination of these, and may be stored as vectors (particularly with respect to street maps) or bitmaps (particularly with respect to satellite images). The various map tiles are each associated with geolocations, such that the server 110 is capable of selecting, retrieving and transmitting one or more tiles based on a receipt of a geolocation or range of geolocations.

The map database may also store street level images 274. Street level images comprise images taken at particular geographical locations. For example, a single street level image may show a perspective view of a street and its associated buildings, taken at a distance a few feet above the street (e.g., from a camera mounted on top of car) and roughly parallel to the ground (e.g., the camera view was pointed down the street into the distance).

In one aspect of the system and method, the street level images are panoramic images, such as but not limited to 360° panoramas centered at the geolocation associated with the image. The street level images typically also store data indicating the orientation of the image. For example, each image may be associated with both a particular geolocation (where the image was taken) and data that allows one to determine which portion of the image points corresponds with facing north, south, east, west, northwest, etc. Typically, the images are stored as raster images, but also may be stored in other formats including videos.

Server 110 may also include other instructions and databases to be used in connection with mobile devices 150, 170.

As noted above, the mobile devices 150, 170 store instructions 153, 173. In one aspect of the invention, the steps performed by the mobile device as described below are performed by a standalone computer program installed on the device. In another aspect of the invention, many of the steps may be performed on the server 110 and reflected on a browser installed on the device 150. For ease of illustration only and not by way of limitation, the remainder of this detailed description will assume that the instructions comprise a standalone computer program unless noted elsewhere herein.

Figure 9:
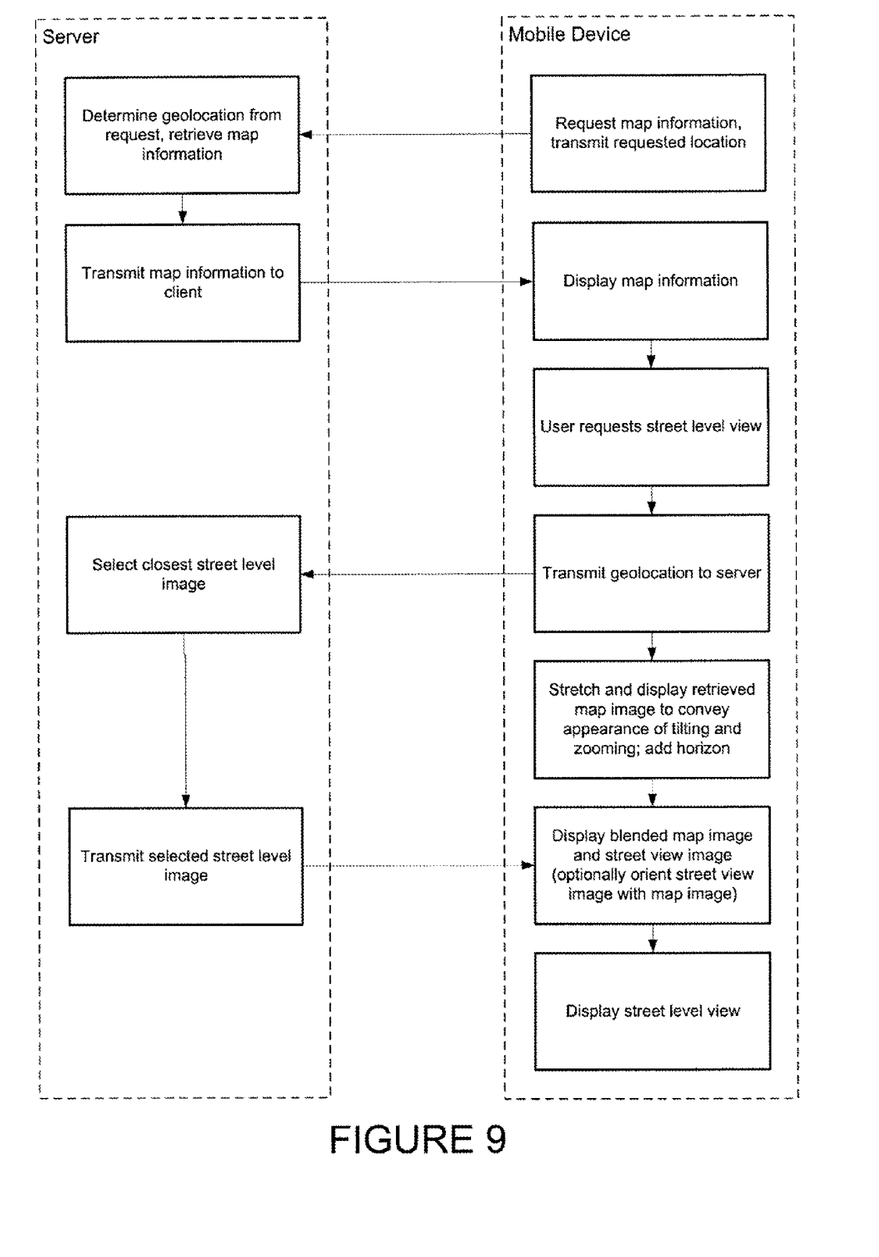
FIG. 9 is a flowchart in accordance with an aspect of the invention.

In addition to the operations illustrated in FIG. 9, various operations in accordance with a variety of aspects of the invention will now be described. It should be understood that the following operations do not have to be performed in the precise order described below. Rather, various steps can be handled in reverse order or simultaneously.

When the user of mobile device 150 wants to view a map of a particular location, the device will send a request for a map along with the desired location to server 110. By way of example, the user may enter an address into the device using a virtual keyboard or physical buttons, and instructions 153 then transmit the request to server 110 over network 295, which may comprise a cellular connection between a cell tower and the device and an Internet connection between the server 110 and the tower.

Figure 3:
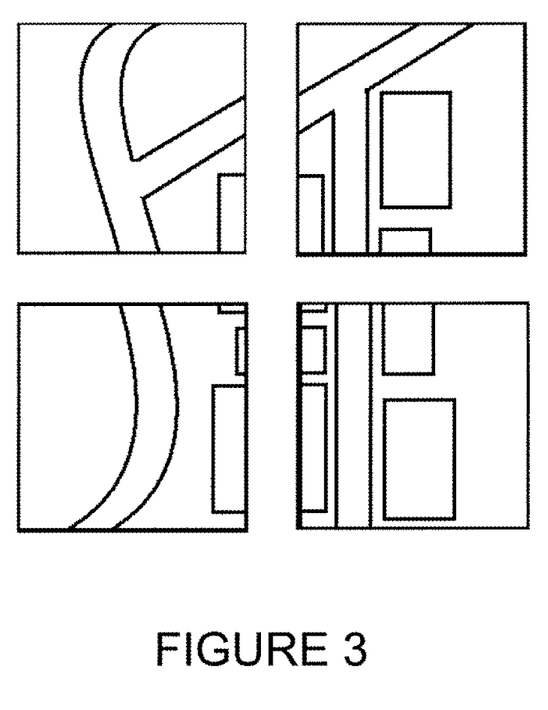
FIG. 3 is a functional diagram of tiles associated with an example image, in accordance with an aspect of the invention.

In response to the request, server 110 retrieves map information that corresponds with the request, and transmits the information to the mobile device 150 for display. For example, the server 110 may determine a latitude/longitude based on the address transmitted by the user and retrieve one or more tiles based on the location (such as the tile at the requested location and surrounding tiles). The server then transmits the tiles to the mobile device. FIG. 3 illustrates an example of four such map tiles.

Figure 4:
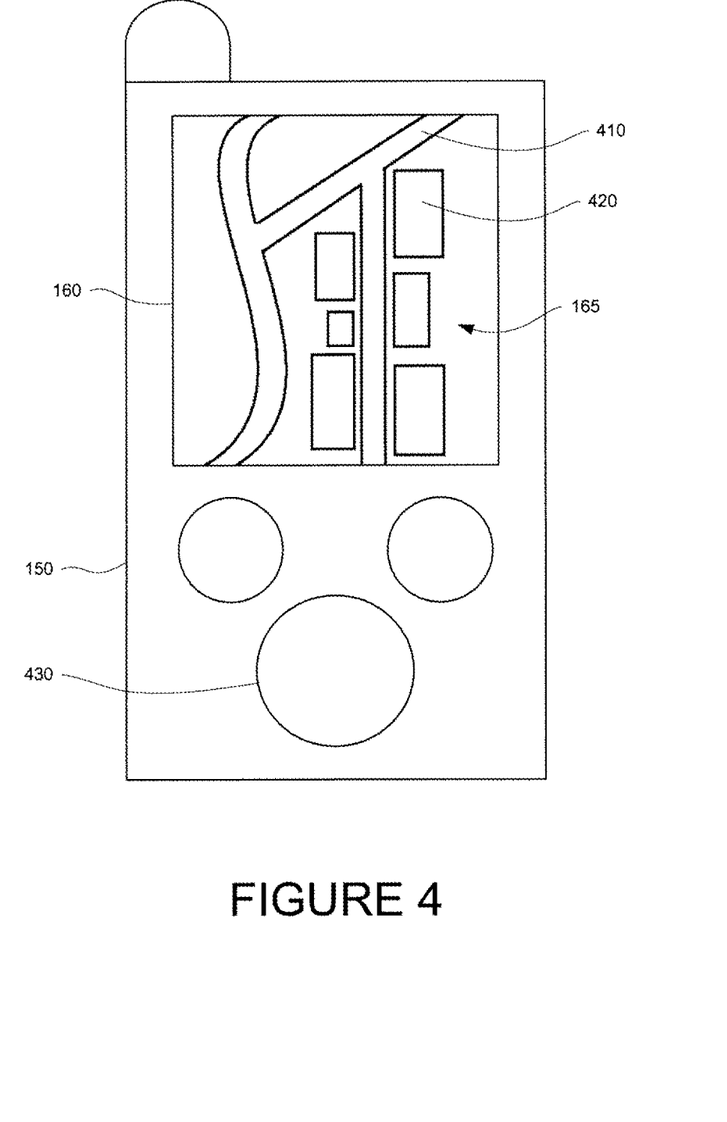
FIG. 4 is a diagram of a mobile device displaying a map image in accordance with an aspect of the invention.

As shown in FIG. 4, mobile device 150 receives the map information, stores it in its data memory 162, and displays the map information on display 160. Preferably, the tiles are displayed in combination such that the tiles collectively appear to show a single unitary map image 165. The map image 165 may show both streets 410 and buildings 420.

Figure 5:
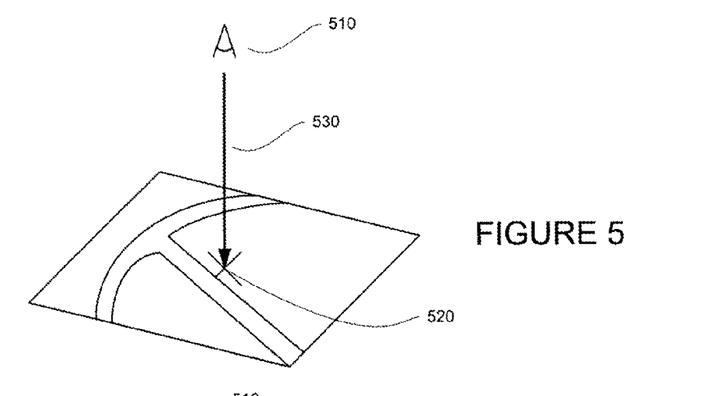
FIG. 5 is a schematic diagram of a perspective for viewing a map image in accordance with an aspect of the invention.

In one aspect of the SYSTEM AND METHOD, the map is first displayed in a top-down view as shown in FIG. 4. In other words, and as shown schematically in FIG. 5, the map is shown from a point of view 510 that looks straight down at ground-level point 520. While this viewpoint may be hereafter characterized as "top-down" or "orthogonal", it will be understood that the "top-down" viewing angle need not be 90 degrees (measured from the plane substantially defining the ground) but rather may be any angle that gives the appearance of looking substantially directly down at the ground.

If the particular geographical area being viewed by the user has a street-level view image associated with it, the user may wish to view it. In one aspect of the invention, the map information that is currently available to the mobile device is used to provide a pleasing transition from the top-down view to the street-level view.

Figure 10A:
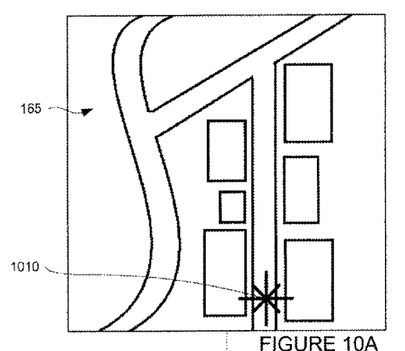
FIG. 10A is a screen shot in accordance with an aspect of the invention.
Figure 11A:
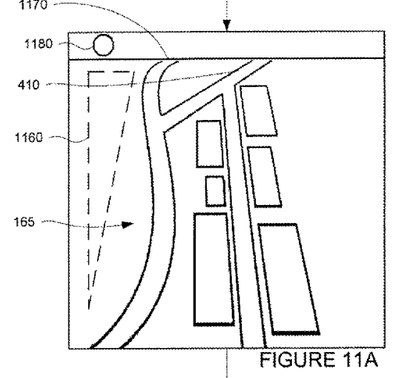
FIG. 11A is a screen shot in accordance with an aspect of the invention.
Figure 12A:
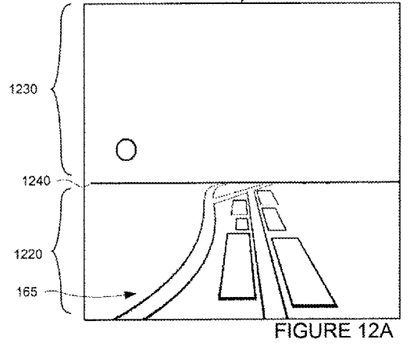
FIG. 12A is a screen shot in accordance with an aspect of the invention.
Figure 12B:
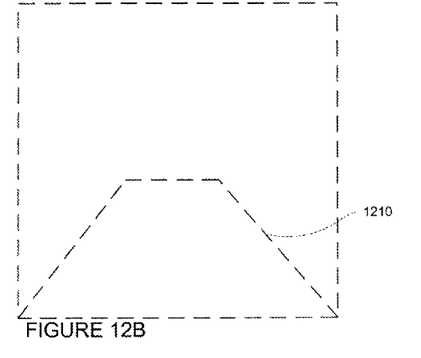
FIG. 12B, among other things, schematically illustrates the shape of a stretched map image shown in FIG. 12A relative to the shape of the map image shown in FIG. 10B.

FIGS. 10A, 11A and 12B are screen shots of tilting the map information in accordance with one aspect of the system and method.

FIG. 10A is a screen shot of the top-down view of the map shown in FIG. 4. To view a street level image, the user may move cursor 1010 to a spot on the map image 165 for which the user wants to see a street-level view of the map, such as by manipulating a mouse and double-clicking, tapping the screen at that location if display 160 is a touch-sensitive screen, moving the cursor to the position by operating directional button 430 (FIG. 4), or moving the entire map image until the desired position is at the center of the screen and then pressing a button. Once the location to be viewed is identified, the user may then request a street level image by tapping an icon on the screen (not shown) or operating a button such as button 430. It will be understood that most aspects of the invention are not limited to any particular system and method of the user requesting a street view at a particular area.

Figure 10B:
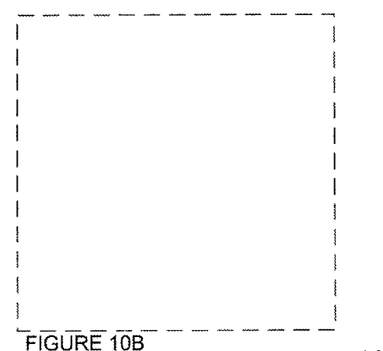
FIG. 10B schematically illustrates the shape of the map image shown in FIG. 10A.

When the user requests a street level image, the processor of mobile device 150 manipulates the displayed map image to provide a transition from the top-down or orthogonal map view to the street level view by making it appear as if the map view is tilting. In one aspect of the system and method, the processor does so by taking the rectangular top-down map image (the shape of which is shown as FIG. 10B) and stretching it into a trapezoid. The new shape 1110 of the image 165 relative to the original shape 1120 is shown by way of example in FIG. 11B, with the resultant image shown to the user appearing in FIG. 11A.

Figure 11B:
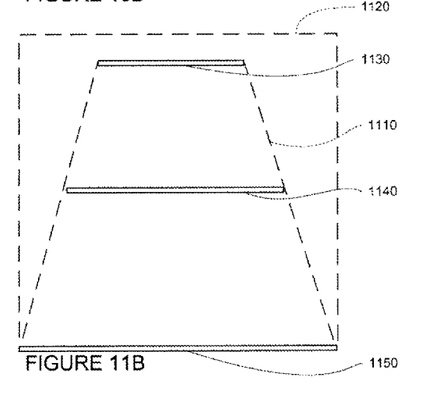
FIG. 11B, among other things, schematically illustrates the shape of a stretched map image shown in FIG. 11A relative to the shape of the map image shown in FIG. 10B.

The system and method is not limited to any particular method of stretching map images. One manner in which the map image 165 may be manipulated is to selectively subsample its pixels. For example, if the height of the trapezoid 1110 is 90% of the height of the original rectangular shape 1120, the map image 165 may be stretched by making a copy of it and then dropping every 10th row of pixels from the copy. Similarly, if the width of the trapezoid is desired to be 50% of the width of the original image at the top and 100% at the bottom, the top row 1130 of pixels in the stretched image 1110 may be created by dropping every other pixel of the top row, dropping none of the pixels in the bottom row 1150, and—with respect to the remaining rows—dropping pixels in proportion to the distance from the top of the screen (e.g., the middle row 1140 would be subsampled to keep 3 of every 4 pixels).

Once the map image 165 is reshaped as desired, it may be displayed on screen 160.

In one aspect of the system and method, the processor will draw more objects on the screen to aid the transition. For example, because the map image 165 is shrunk relative to the total area of the display 160, the sides 1160 of the screen that had been previously occupied by the original image 165 may be colored the same as the background color of the original map image.

Moreover, a horizon may be shown to convey the change in perspective. The horizon may be created by drawing a line 1170 from the left side of the screen 160 to right side. In one aspect of the system and method, the horizon is drawn at, or closely above or closely below, the top row 1130 of the stretched map image. In this particular aspect of the invention, the horizon is not a completely accurate representation of what would appear in the real world; absent unusual geographic topography, the top of the image (such as the end of the street 410) would not extend all the way to the horizon. However, by using only the map image that has already been received by the mobile device 150, this aspect of the system and method avoids the delay associated with downloading additional information from server 110. Moreover, this aspect permits the processor of the mobile device to process a relatively small number of pixels to create the appearance of tilt and a horizon: the pixels in the currently displayed image. Even if available, the addition of image information beyond the currently-displayed top-down image (such as retrieving and showing the actual geographic features between the end of street 410 and horizon 1170) may tax the relatively small processors in many mobile devices.

The processor may modify the screen image even further by adding objects above the horizon. In that regard, the processor may draw a sun 1180 or moon above the horizon 1170. The processor may also color the area above the horizon light blue or dark purple, depending on whether the mobile device's internal clock indicates whether it is daytime or nighttime. Moreover, additional information may be added to reflect the present conditions at the geolocation. For example, if external data indicates that it is raining at the geolocation, then rain may be inserted against a gray sky instead of a sun against a blue sky.

Preferably, the tilt is animated and progresses over time. As shown across FIGS. 10-12, the tilt is increased iteratively until a desired viewing angle is reached as shown in FIG. 12. For example, relative to FIG. 11, the trapezoid 1210 would be decreased even further in height (FIG. 12B) until a desired angle of tilt, and ratio of ground 1220 to sky 130 as segregated by horizon 1240, is achieved.

Figure 13A:
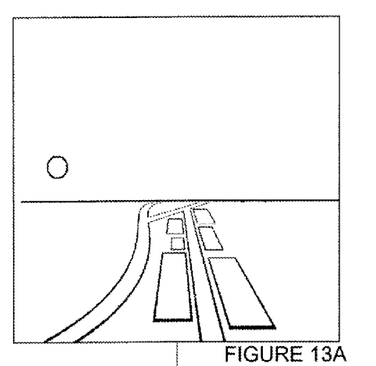
FIG. 13A is a screen shot in accordance with an aspect of the invention.
Figure 13B:
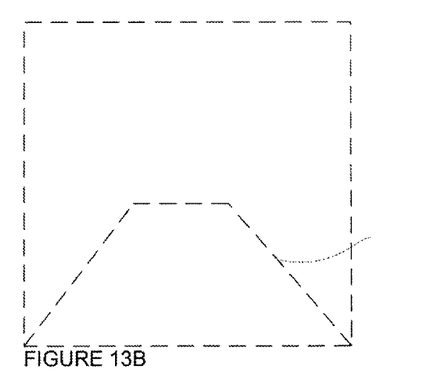
FIG. 13B, among other things, schematically illustrates the shape of a stretched map image shown in FIG. 13A relative to the shape of the map image shown in FIG. 10B.
Figures 14A, 14B:
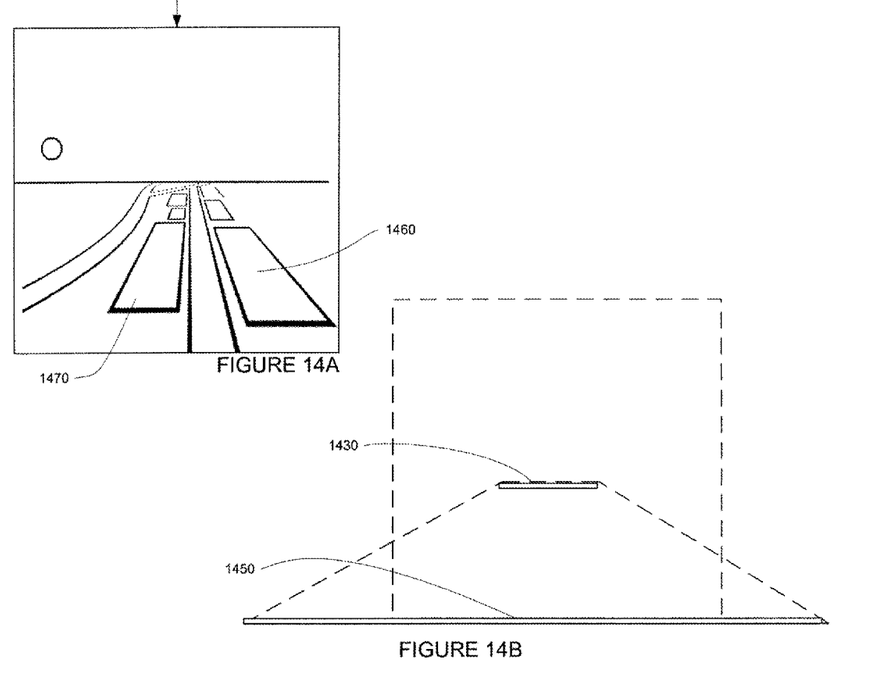
FIG. 14A is a screen shot in accordance with an aspect of the invention.
FIG. 14B, among other things, schematically illustrates the shape of a stretched map image shown in FIG. 14A relative to the shape of the map image shown in FIG. 10B.

In addition to tilting, the system and method may also zoom in as shown in FIGS. 13-14. (FIGS. 13A-B are identical to FIGS. 12A-B and repeated for ease of contrast with FIGS. 14A-B.) As with the tilting, the invention is not limited to any particular system and method of conveying the impression of zooming. However, in one aspect of the system and method, the zoom is presented without obtaining additional map information form the server, e.g., using only the image that was displayed prior to the tilting and zooming. For example, the pixels along the bottom row 1450 may be doubled, and the pixels that would extend beyond the edges of the screen 160 discarded. The pixels along the top row 1430 of the stretched image of the image could remain unchanged, and rows in between the top and bottom row could have their pixels duplicated in proportion to their distance from the top row (e.g., doubling every second pixel in one of the rows).

As with the tilting, the zooming may be performed iteratively to give the impression of gradually moving closer the selected portion of the map. By way of example, the buildings 1460 and 1470 along the bottom of the image are drawn larger in FIG. 14 (after zooming) than FIG. 13 (prior to zooming).

Figure 6:
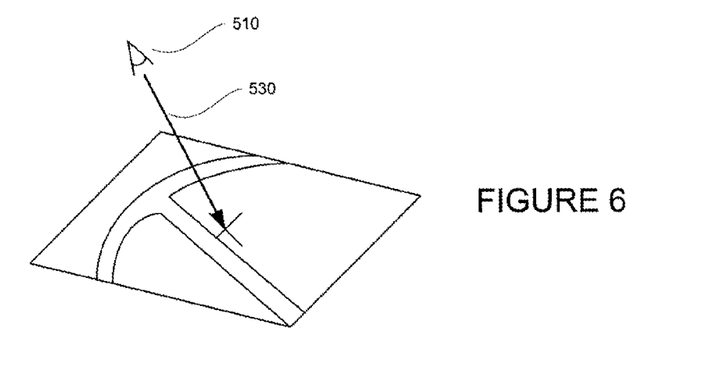
FIG. 6 is a schematic diagram of a changed perspective, relative to FIG. 5, for viewing a map image in accordance with an aspect of the invention.
Figure 7:
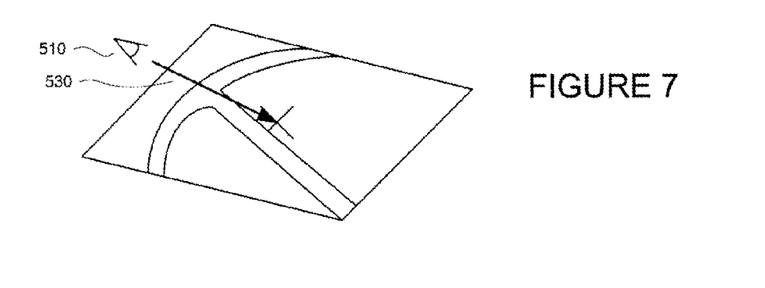
FIG. 7 is a schematic diagram of a changed perspective, relative to FIG. 6, for viewing a map image in accordance with an aspect of the invention.
Figure 8:
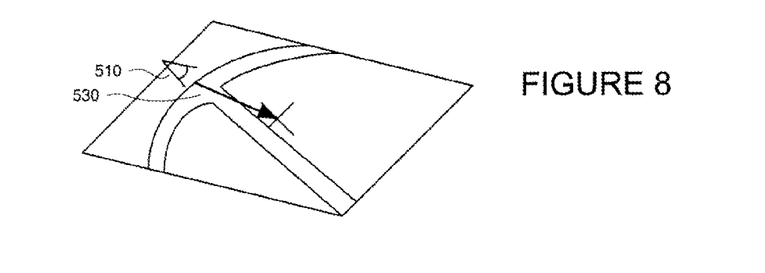
FIG. 8 is a schematic diagram of a changed perspective, relative to FIG. 7, for viewing a map image in accordance with an aspect of the invention.

In another aspect of the system and method, the tilting and zooming occur simultaneously, which can make it appear as if the user is diving into the image. For example, the processor may increase both the zoom and tilt a little before each incremental display of the stretched map image. Alternatively, the processor may alternately zoom and display, and tilt and display, which would effectively appear simultaneous to the user. The changing view would be similar to being in the cockpit of a plane at a large height above—and pointed at—the ground. The changing view would convey the impression of the plane simultaneously getting closer to—and becoming level with—the ground. This concept is illustrated functionally in FIGS. 5-9 where the viewpoint (indicated by eye 510 and vector) changes from a high, top-down view (FIG. 5), to a somewhat tilted view closer to the desired point (FIG. 6), to an even more tilted and closer view (FIG. 7) and then finally a relatively close view that is substantially parallel to the ground (FIG. 8) (by way of example only and not by limitation, a 0 to 5 degree angle compared to the ground).

The map image may be manipulated in other ways as well. By way of example only, the image may be translated in the x,y plane or rotated so as to better correspond with the geolocation of the street view image.

Once the display 160 of mobile device 150 is showing the map at the desired tilt and zoom amount, the street level image of the geographic location may be shown. In that regard, mobile device 150 requests a street level image 274 based on the geolocation currently being displayed such as the geolocation associated with the bottom center of the stretched image. In response, processor 210 of server 110 may select and transmit the street level image 274 having a geolocation location that is closest to the requested geolocation transmitted by mobile device 150.

In one aspect, the street level image is requested as soon as the tilt and zoom begins. If the connection is fast enough, this allows the street level image to be downloaded and ready and soon as the tilt and zoom transition ends. In that regard, because the user can watch an animation pending the download, the delay in downloading the information will be less noticeable, if noticeable at all.

Figure 15:
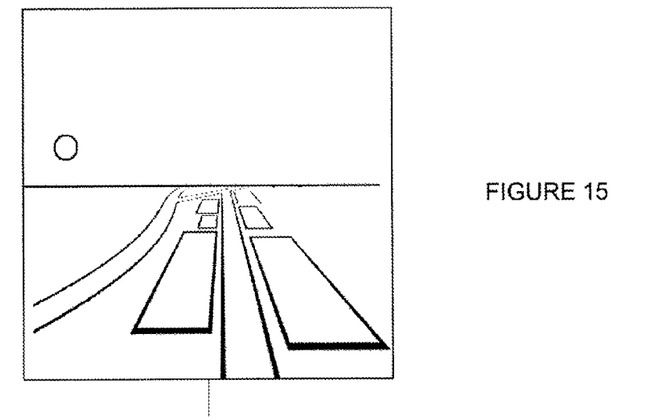
FIG. 15 is a screen shot in accordance with an aspect of the invention.

In one aspect of the invention, the street level view is also oriented to match the orientation of the map view. For example, if the user is looking north in FIG. 15 (which is identical to FIG. 14 and repeated for comparison with FIGS. 16 and 17), the street level image is oriented to display in a northward direction (such as by transmitting only the northward view to the mobile device, or by transmitting the entire panorama and allowing the mobile device to select the northern portion of the image). Moreover, the height of the horizon line may be adjusted to coincide with the height of the horizon or the expected height of the horizon.

Figure 16:
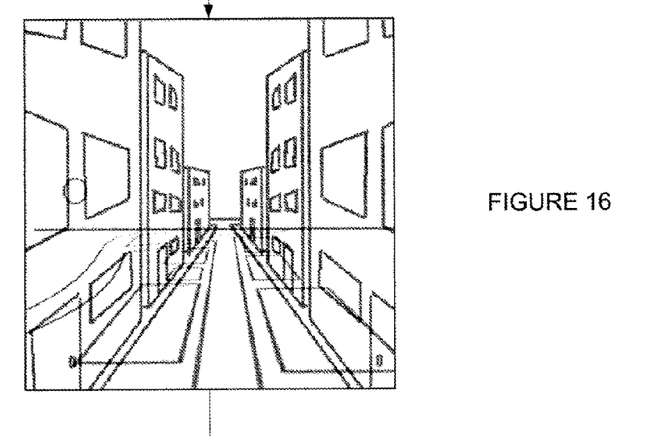
FIG. 16 is a screen shot in accordance with an aspect of the invention.
Figure 17:
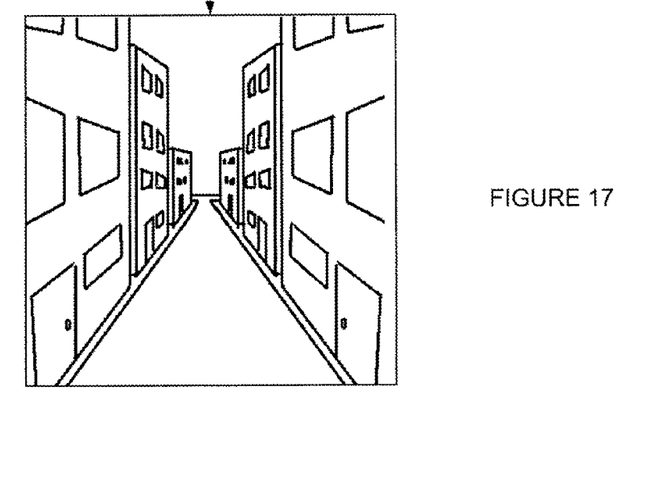
FIG. 17 is a screen shot in accordance with an aspect of the invention.

As shown in FIG. 16, the map image and street level image may be blended together before the street level image is displayed. For example, the two images may be alpha-blended such that opacity of the street level image increases over time and the opacity of the map image decreases over time until, finally, only the street level image is showing (FIG. 17).

One or more of the zooming, tilting, and orienting of the street level image allows the user to put the street level image in the context of the map being displayed.

Advantageously, the invention provides for various alternatives to the foregoing. By way of example only, the transition to the street level view may occur automatically as soon as the user indicates a desire to zoom to a level exceeding the greatest zoom level recommended or permitted for the map image 165.

Moreover, while stretching the currently displayed map information results in particular advantages, other aspects of the invention add more map information to the stretched image. For example, before the user requests the street level image, the mobile device may have received tiles that neighbor the tiles currently being displayed. These non-displayed tiles may have been retrieved from the server and stored in the mobile device's memory either in anticipation of the user panning the map, or may remain in the memory after being previously displayed. If available, such tiles may also be used when displaying the stretched image, such as by stretching and showing those tiles along the sides 1160 when the map image is stretched (FIG. 11). Similarly, if available, such neighboring tiles may be disposed between the top row 1130 of the currently displayed image and the horizon. In an alternative aspect of the invention, the mobile device may request and display a few more neighboring tiles after receiving the request for the street level view; however, this may delay the transition.

Yet further, the instructions 173 of the mobile device 170 may comprise a browser, where the tilting/zooming images are rendered and transmitted by the server 110 for display by the browser. However, such an embodiment would lack some of the advantages of the other aspects which require far less information to conveyed between the mobile device and the server.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the summary and claims.

The invention claimed is:

1. A system comprising:
a display,
a user input, and
one or more processors capable of processing instructions, the instructions comprising:
displaying a map image, from a substantially top-down perspective, of a location on the display;
accessing, based on the location, a street level image in response to a user's activation of the user input, wherein the street level image displays a perspective-view image captured by a camera;
displaying a transition between the map image and the street level image, the transition including
displaying a horizon line wherein the position of the horizon line on the screen is selected so as to coincide with the position of the street level image's horizon on the screen, and
iteratively stretching the map image to the horizon line so as to make the map appear to be tilted; and
after displaying the transition, displaying the street level image.

2. The system of claim 1 further comprising a server storing maps and street level images, and wherein the instructions comprise obtaining the street level image from the server via a network.

3. The system of claim 2 wherein the instructions further comprise receiving the map image from a server via the network.

4. The system of claim 3 wherein the network is wireless.

5. The system of claim 1 wherein the map image and street level image are associated with geographic locations.

6. The system of claim 1 further comprising a component for determining the location of the system and wherein the map image is selected for display based on a geographic location provided by a GPS receiver.

7. The system of claim 6 wherein the component comprises a GPS receiver.

8. The system of claim 6 wherein the system is a phone.

9. The system of claim 1 wherein the instructions further comprise adding objects that are displayed above the horizon.

10. The system of claim 1 wherein the orientation of the street level image matches the orientation of the map prior to the display of the street level image.

11. A system comprising:
a display,
a user input, and
one or more processors capable of processing instructions, the instructions comprising:
displaying a map image of a location on the display;
obtaining, via a wireless network and based on the location, a street level image in response to a user's activation of the user input, wherein the street level image displays a perspective-view image captured by a camera;
prior to displaying the street level image, displaying a transition between the map image and the street level image, the transition including:
displaying a horizon line, and
iteratively stretching the map image to the horizon line so as to make the map appear to be tilted; and
after displaying the transition, displaying the street level image.

12. The system of claim 11 wherein the user input is a microphone.

13. The system of claim 11 wherein the display is touch-sensitive and the user input is the touch-sensitive display.

14. A method comprising
displaying, by one or more processors, a map image of a location on a display from a substantially top-down perspective;
accessing, by one or more processors, based on the location, a street level image in response to a user's activation of the user input, wherein the street level image displays a perspective-view image captured by a camera;
displaying, by one or more processors, a transition between the map image and the street level image, the transition including displaying a horizon line wherein the position of the horizon line on the screen is selected so as to coincide with the position of the street level image's horizon on the screen, and iteratively stretching the map image to the horizon line so as to make the map appear to be tilted; and
after displaying the transition, displaying, by one or more processors, the street level image.

15. The method of claim 14 wherein the map image and the street level image are associated with geographic locations.

16. The method of claim 14 further comprising displaying objects above the horizon.

17. The method of claim 14 wherein the orientation of the street level image matches the orientation of the map prior to the display of the street level image.

18. The method of claim 14 wherein the street level image is accessed from a server via a wireless network.

19. The method of claim 14 wherein a portion of the received map is displayed from a substantially top-down perspective without displaying another portion of the map image, and wherein the map portion that was not displayed is displayed during the iterative tilting.

20. The method of claim 19 wherein the iterative tilting comprises stretching and displaying both the portion of the map that was displayed from a substantially top-down perspective, and the map portion that was not displayed.

* * * * *